United States Patent
Yeakley et al.

(10) Patent No.: US 10,972,480 B2
(45) Date of Patent: Apr. 6, 2021

(54) DEVICE MANAGEMENT PROXY FOR SECURE DEVICES

(71) Applicant: Hand Held Products, Inc., Fort Mill, SC (US)

(72) Inventors: Daniel D. Yeakley, Monroe, NC (US); Arthur Millican, Granite Falls, WA (US)

(73) Assignee: Hand Held Products, Inc., Fort Mill, SC (US)

( * ) Notice: Subject to any disclaimer, the term of this patent is extended or adjusted under 35 U.S.C. 154(b) by 10 days.

(21) Appl. No.: 15/933,594

(22) Filed: Mar. 23, 2018

(65) Prior Publication Data

US 2018/0212978 A1 Jul. 26, 2018

Related U.S. Application Data

(63) Continuation of application No. 14/676,327, filed on Apr. 1, 2015, now Pat. No. 9,930,050.

(51) Int. Cl.
| | |
|---|---|
| *H04L 29/06* | (2006.01) |
| *G06F 21/57* | (2013.01) |
| *H04L 12/24* | (2006.01) |
| *H04W 12/00* | (2021.01) |

(52) U.S. Cl.
CPC ............ *H04L 63/126* (2013.01); *G06F 21/57* (2013.01); *H04L 41/0813* (2013.01); *H04L 41/28* (2013.01); *H04W 12/0023* (2019.01)

(58) Field of Classification Search
CPC ... H04L 63/126; H04L 41/28; H04L 41/0813; G06F 21/57
See application file for complete search history.

(56) References Cited

U.S. PATENT DOCUMENTS

| | | |
|---|---|---|
| 6,275,851 B1 | 8/2001 | Cromer et al. |
| 6,683,954 B1 | 1/2004 | Searle |
| 6,789,135 B1 | 9/2004 | Yamamoto et al. |
| 6,832,725 B2 | 12/2004 | Gardiner et al. |
| 7,128,266 B2 | 10/2006 | Zhu et al. |

(Continued)

FOREIGN PATENT DOCUMENTS

| | | |
|---|---|---|
| WO | 2013/163789 A1 | 11/2013 |
| WO | 2013/173985 A1 | 11/2013 |

(Continued)

OTHER PUBLICATIONS

Fiberlink, "MaaS360 Mobile Device Management (MDM)—Administrators Guide", MaaS360 by Fiberlink, Published Apr. 2014 (Year: 2014).*

(Continued)

*Primary Examiner* — Chau Le
(74) *Attorney, Agent, or Firm* — Alston & Bird LLP

(57) ABSTRACT

A hardware device architecture is described that improves security and flexibility in access to hardware device settings. A device management proxy service is digitally signed and granted access to device settings. Applications are then digitally provisioned by the proxy service and only validated signed requests from applications are permitted to change hardware device settings. Further granularity over hardware device settings is achieved through user accounts and groups established by the applications.

11 Claims, 15 Drawing Sheets

(56) References Cited

U.S. PATENT DOCUMENTS

| | | |
|---|---|---|
| 7,159,783 B2 | 1/2007 | Walczyk et al. |
| 7,213,152 B1 | 5/2007 | Gafken et al. |
| 7,413,127 B2 | 8/2008 | Ehrhart et al. |
| 7,726,575 B2 | 6/2010 | Wang et al. |
| 8,073,935 B2 | 12/2011 | Viswanath |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,490,877 B2 | 7/2013 | Kearney |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| D716,285 S | 10/2014 | Chaney et al. |
| 8,851,383 B2 | 10/2014 | Yeakley et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,908,995 B2 | 12/2014 | Benos et al. |
| 8,910,870 B2 | 12/2014 | Li et al. |
| 8,914,290 B2 | 12/2014 | Hendrickson et al. |
| 8,914,788 B2 | 12/2014 | Pettinelli et al. |
| 8,915,444 B2 | 12/2014 | Havens et al. |
| 8,918,250 B2 | 12/2014 | Hollifield |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,332 B2 | 2/2015 | Harding et al. |
| 8,950,678 B2 | 2/2015 | Germaine et al. |
| D723,560 S | 3/2015 | Zhou et al. |
| 8,971,346 B2 | 3/2015 | Sevier |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 9,015,513 B2 | 4/2015 | Murawski et al. |

(56) References Cited

U.S. PATENT DOCUMENTS

| | | | |
|---|---|---|---|
| D730,357 S | 5/2015 | Fitch et al. | |
| 9,030,964 B2 | 5/2015 | Essinger et al. | |
| 9,036,054 B2 | 5/2015 | Koziol et al. | |
| 9,037,344 B2 | 5/2015 | Chamberlin | |
| 9,038,911 B2 | 5/2015 | Xian et al. | |
| 9,038,915 B2 | 5/2015 | Smith | |
| D730,901 S | 6/2015 | Oberpriller et al. | |
| D730,902 S | 6/2015 | Fitch et al. | |
| D733,112 S | 6/2015 | Chaney et al. | |
| 9,047,098 B2 | 6/2015 | Barten | |
| 9,047,420 B2 | 6/2015 | Caballero | |
| 9,047,531 B2 | 6/2015 | Showering et al. | |
| 9,049,640 B2 | 6/2015 | Wang et al. | |
| 9,053,055 B2 | 6/2015 | Caballero | |
| 9,053,378 B1 | 6/2015 | Hou et al. | |
| 9,057,641 B2 | 6/2015 | Amundsen et al. | |
| 9,058,526 B2 | 6/2015 | Powilleit | |
| 9,064,167 B2 | 6/2015 | Xian et al. | |
| 9,064,254 B2 | 6/2015 | Todeschini et al. | |
| 9,070,032 B2 | 6/2015 | Corcoran | |
| D734,339 S | 7/2015 | Zhou et al. | |
| D734,751 S | 7/2015 | Oberpriller et al. | |
| 9,082,023 B2 | 7/2015 | Feng et al. | |
| 2002/0048369 A1 | 4/2002 | Ginter et al. | |
| 2002/0181641 A1 | 12/2002 | Wingen | |
| 2005/0039016 A1 | 2/2005 | Aissi et al. | |
| 2007/0063048 A1 | 3/2007 | Havens et al. | |
| 2008/0126740 A1* | 5/2008 | Wrighton | G06F 9/45516 |
| | | | 711/208 |
| 2008/0183896 A1 | 7/2008 | Carlson et al. | |
| 2008/0184060 A1 | 7/2008 | Carlson et al. | |
| 2008/0185432 A1 | 8/2008 | Caballero et al. | |
| 2008/0298589 A1 | 12/2008 | Katar et al. | |
| 2009/0134221 A1 | 5/2009 | Zhu et al. | |
| 2009/0221267 A1 | 9/2009 | Bender et al. | |
| 2009/0238367 A1 | 9/2009 | Pinder | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0161672 A1 | 6/2011 | Martinez et al. | |
| 2011/0169999 A1 | 7/2011 | Grunow et al. | |
| 2011/0202554 A1 | 8/2011 | Powilleit et al. | |
| 2012/0054877 A1* | 3/2012 | Rosu | G06F 9/545 |
| | | | 726/30 |
| 2012/0111946 A1 | 5/2012 | Golant | |
| 2012/0138685 A1 | 6/2012 | Qu et al. | |
| 2012/0168511 A1 | 7/2012 | Kotlarsky et al. | |
| 2012/0168512 A1 | 7/2012 | Kotlarsky et al. | |
| 2012/0193423 A1 | 8/2012 | Samek | |
| 2012/0203647 A1 | 8/2012 | Smith | |
| 2012/0223141 A1 | 9/2012 | Good et al. | |
| 2012/0228382 A1 | 9/2012 | Havens et al. | |
| 2012/0248188 A1 | 10/2012 | Kearney | |
| 2012/0284702 A1* | 11/2012 | Ganapathy | G06F 9/468 |
| | | | 717/174 |
| 2013/0043312 A1 | 2/2013 | Van Horn | |
| 2013/0056285 A1 | 3/2013 | Meagher | |
| 2013/0070322 A1 | 3/2013 | Fritz et al. | |
| 2013/0075168 A1 | 3/2013 | Amundsen et al. | |
| 2013/0082104 A1 | 4/2013 | Kearney et al. | |
| 2013/0175341 A1 | 7/2013 | Kearney et al. | |
| 2013/0175343 A1 | 7/2013 | Good | |
| 2013/0179676 A1* | 7/2013 | Hamid | H04L 9/08 |
| | | | 713/150 |
| 2013/0200158 A1 | 8/2013 | Feng et al. | |
| 2013/0254542 A1* | 9/2013 | Buer | H04L 63/045 |
| | | | 713/168 |
| 2013/0256418 A1 | 10/2013 | Havens et al. | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0278425 A1 | 10/2013 | Cunningham et al. | |
| 2013/0287258 A1 | 10/2013 | Kearney | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306730 A1 | 11/2013 | Brady et al. | |
| 2013/0306731 A1 | 11/2013 | Pedrao | |
| 2013/0307964 A1 | 11/2013 | Bremer et al. | |
| 2013/0308625 A1 | 11/2013 | Park et al. | |
| 2013/0313324 A1 | 11/2013 | Koziol et al. | |
| 2013/0313325 A1 | 11/2013 | Wilz et al. | |
| 2013/0341399 A1 | 12/2013 | Xian et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008430 A1 | 1/2014 | Soule et al. | |
| 2014/0008439 A1 | 1/2014 | Wang | |
| 2014/0025584 A1 | 1/2014 | Liu et al. | |
| 2014/0027518 A1 | 1/2014 | Edmonds et al. | |
| 2014/0031024 A1* | 1/2014 | Xie | G06F 21/57 |
| | | | 455/418 |
| 2014/0034734 A1 | 2/2014 | Sauerwein, Jr. | |
| 2014/0036848 A1 | 2/2014 | Pease et al. | |
| 2014/0039693 A1 | 2/2014 | Havens et al. | |
| 2014/0042814 A1 | 2/2014 | Kather et al. | |
| 2014/0044265 A1* | 2/2014 | Kocher | H04L 63/083 |
| | | | 380/277 |
| 2014/0049120 A1 | 2/2014 | Kohtz et al. | |
| 2014/0049635 A1 | 2/2014 | Laffargue et al. | |
| 2014/0061305 A1 | 3/2014 | Nahill et al. | |
| 2014/0061306 A1 | 3/2014 | Wu et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0075846 A1 | 3/2014 | Woodburn | |
| 2014/0076974 A1 | 3/2014 | Havens et al. | |
| 2014/0078341 A1 | 3/2014 | Havens et al. | |
| 2014/0078342 A1 | 3/2014 | Li et al. | |
| 2014/0078345 A1 | 3/2014 | Showering | |
| 2014/0084068 A1 | 3/2014 | Gillet et al. | |
| 2014/0097249 A1 | 4/2014 | Gomez et al. | |
| 2014/0098792 A1 | 4/2014 | Wang et al. | |
| 2014/0100774 A1 | 4/2014 | Showering | |
| 2014/0100813 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Giordano et al. | |
| 2014/0104451 A1 | 4/2014 | Todeschini et al. | |
| 2014/0106594 A1 | 4/2014 | Skvoretz | |
| 2014/0106725 A1 | 4/2014 | Sauerwein, Jr. | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |
| 2014/0121438 A1 | 5/2014 | Long et al. | |
| 2014/0121445 A1 | 5/2014 | Fontenot et al. | |
| 2014/0124577 A1 | 5/2014 | Wang et al. | |
| 2014/0124579 A1 | 5/2014 | Ding | |
| 2014/0125842 A1 | 5/2014 | Winegar | |
| 2014/0125853 A1 | 5/2014 | Wang | |
| 2014/0125999 A1 | 5/2014 | Longacre et al. | |
| 2014/0129378 A1 | 5/2014 | Richardson | |
| 2014/0131438 A1 | 5/2014 | Kearney | |
| 2014/0131441 A1 | 5/2014 | Nahill et al. | |
| 2014/0131443 A1 | 5/2014 | Smith | |
| 2014/0131444 A1 | 5/2014 | Wang | |
| 2014/0131445 A1 | 5/2014 | Ding et al. | |
| 2014/0131448 A1 | 5/2014 | Xian et al. | |
| 2014/0133379 A1 | 5/2014 | Wang et al. | |
| 2014/0136208 A1 | 5/2014 | Maltseff et al. | |
| 2014/0140585 A1 | 5/2014 | Wang | |
| 2014/0151453 A1 | 6/2014 | Meier et al. | |
| 2014/0152882 A1 | 6/2014 | Samek et al. | |
| 2014/0158770 A1 | 6/2014 | Sevier et al. | |

(56) References Cited

U.S. PATENT DOCUMENTS

| | | |
|---|---|---|
| 2014/0159869 A1 | 6/2014 | Zumsteg et al. |
| 2014/0160329 A1 | 6/2014 | Ren et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0166760 A1 | 6/2014 | Meier et al. |
| 2014/0166761 A1 | 6/2014 | Todeschini et al. |
| 2014/0168787 A1 | 6/2014 | Wang et al. |
| 2014/0175165 A1 | 6/2014 | Havens et al. |
| 2014/0175169 A1 | 6/2014 | Kosecki et al. |
| 2014/0175172 A1 | 6/2014 | Jovanovski et al. |
| 2014/0175174 A1 | 6/2014 | Barber et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0258362 A1* | 9/2014 | Komatsu ............... G06F 8/65 709/201 |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | Digregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0331279 A1* | 11/2014 | Aissi ............... G06F 21/53 726/1 |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0380031 A1* | 12/2014 | Jones ............... G06F 21/572 713/2 |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Scheuren et al. |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0222604 A1 | 8/2015 | Ylonen |
| 2017/0302441 A1* | 10/2017 | Temple ............... G06F 21/79 |

FOREIGN PATENT DOCUMENTS

| | | | |
|---|---|---|---|
| WO | 2014/019130 A1 | 2/2014 | |
| WO | 2014/110495 A1 | 7/2014 | |

OTHER PUBLICATIONS

U.S. Appl. No. 29/523,098 for Handle for a Tablet Computer filed Apr. 7, 2015 (Bidwell et al.); 17 pages.

U.S. Appl. No. 29/524,186 for Scanner filed Apr. 17, 2015 (Zhou et al.); 17 pages.

U.S. Appl. No. 29/525,068 for Tablet Computer With Removable Scanning Device filed Apr. 27, 2015 (Schulte et al.); 19 pages.

U.S. Appl. No. 29/526,918 for Charging Base filed May 14, 2015 (Fitch et al.); 10 pages.

U.S. Appl. No. 29/528,165 for In-Counter Barcode Scanner filed May 27, 2015 (Oberpriller et al.); 13 pages.

U.S. Appl. No. 29/528,590 for Electronic Device filed May 29, 2015 (Fitch et al.); 9 pages.

U.S. Appl. No. 29/528,890 for Mobile Computer Housing filed Jun. 2, 2015 (Fitch et al.); 61 pages.

U.S. Appl. No. 29/529,441 for Indicia Reading Device filed Jun. 8, 2015 (Zhou et al.); 14 pages.

U.S. Appl. No. 29/530,600 for Cyclone filed Jun. 18, 2015 (Vargo et al); 16 pages.

U.S. Patent Application for a Device Having Light Source to Reduce Surface Pathogens, filed Sep. 6, 2013 (Todeschini), U.S. Appl. No. 14/019,616.

U.S. Patent Application for a Handheld Indicia Reader Having Locking Endcap, filed Sep. 11, 2013 (Gannon), U.S. Appl. No. 14/023,762.

U.S. Patent Application for a Laser Scanning Module Employing an Elastomeric U-Hinge Based Laser Scanning Assembly, filed Feb. 7, 2012 (Feng et al.), U.S. Appl. No. 13/367,978.

U.S. Patent Application for a Mobile-Phone Adapter for Electronic Transactions, filed Jul. 10, 2014 (Hejl), U.S. Appl. No. 14/327,827.

(56) References Cited

OTHER PUBLICATIONS

U.S. Patent Application for a System and Method for Indicia Verification, filed Jul. 18, 2014 (Hejl), U.S. Appl. No. 14/334,934.
U.S. Patent Application for an Axially Reinforced Flexible Scan Element, filed Jul. 25, 2014 (Reublinger et al.); 41 pages, U.S. Appl. No. 14/340,627.
U.S. Patent Application for Autofocus Lens System for Indicia Readers filed Apr. 29, 2014 (Ackley et al.), U.S. Appl. No. 14/264,173.
U.S. Patent Application for Dimensioning System With Guided Alignment, filed Aug. 6, 2014 (Li et al.), U.S. Appl. No. 14/453,019.
U.S. Patent Application for Docking System and Method Using Near Field Communication filed Apr. 21, 2014 (Showering), U.S. Appl. No. 14/257,364.
U.S. Patent Application for Hand-Mounted Indicia-Reading Device with Finger Motion Triggering filed Apr. 1, 2014 (Van Horn et al.), U.S. Appl. No. 14/231,898.
U.S. Patent Application for Indicia Reader for Size-Limited Applications filed Mar. 7, 2014 (Feng et al.), U.S. Appl. No. 14/200,405.
U.S. Patent Application for Interactive Indicia Reader, filed Aug. 6, 2014 (Todeschini), U.S. Appl. No. 14/452,697.
U.S. Patent Application for Mobile Computing Device With Data Cognition Software, filed on Aug. 19, 2014 (Todeschini et al.), U.S. Appl. No. 14/462,801.
U.S. Patent Application for Multifunction Point of Sale Apparatus With Optical Signature Capture filed Jul. 30, 2014 (Good et al.), U.S. Appl. No. 14/446,391.
U.S. Patent Application for Multipurpose Optical Reader, filed May 14, 2014 (Jovanovski et al.); 59 pages; now abandoned., U.S. Appl. No. 14/277,337.
U.S. Patent Application for System and Method for Measuring Irregular Objects with a Single Camera filed Jan. 28, 2014 (Li et al.), U.S. Appl. No. 14/165,980.
U.S. Patent Application for Terminal Having Illumination and Focus Control filed May 21, 2014 (Liu et al.), U.S. Appl. No. 14/283,282.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 4, pages.
U.S. Appl. No. 29/486,759 for an Imaging Terminal, filed Apr. 2, 2014 (Oberpriller et al.); 8 pages.
U.S. Appl. No. 29/492,903 for an Indicia Scanner, filed Jun. 4, 2014 (Zhou et al.); 23 pages.
U.S. Appl. No. 29/494,725 for an In-Counter Barcode Scanner, filed Jun. 24, 2014 (Oberpriller et al.); 23 pages.
U.S. Patent Application Reading Apparatus Having Partial Frame Operating Mode filed Apr. 11, 2014, (Deng et al.), U.S. Appl. No. 14/250,923.
U.S. Appl. No. 13/367,978, filed Feb. 7, 2012, (Feng et al.); now abandoned.
Requirement for Restriction/Election dated Mar. 1, 2017 for U.S. Appl. No. 14/676,327.
Notice of Allowance for U.S. Appl. No. 14/676,327, dated Nov. 16, 2017, 9 pages.
Office Action for U.S. Appl. No. 14/676,327, dated Jul. 27, 2017, 8 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/483,056 for Variable Depth of Field Barcode Scanner filed Sep. 10, 2014 (McCloskey et al.); 29 pages.
U.S. Appl. No. 14/513,808 for Identifying Inventory Items in a Storage Facility filed Oct. 14, 2014 (Singel et al.); 51 pages.
U.S. Appl. No. 14/519,179 for Dimensioning System With Multipath Interference Mitigation filed Oct. 21, 2014 (Thuries et al.); 30 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/519,249 for Handheld Dimensioning System With Measurement-Conformance Feedback filed Oct. 21, 2014 (Ackley et al.); 36 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/529,563 for Adaptable Interface for a Mobile Computing Device filed Oct. 31, 2014 (Schoon et al.); 36 pages.
U.S. Appl. No. 14/529,857 for Barcode Reader With Security Features filed Oct. 31, 2014 (Todeschini et al.); 32 pages.
U.S. Appl. No. 14/531,154 for Directing an Inspector Through an Inspection filed Nov. 3, 2014 (Miller et al.); 53 pages.
U.S. Appl. No. 14/533,319 for Barcode Scanning System Using Wearable Device With Embedded Camera filed Nov. 5, 2014 (Todeschini); 29 pages.
U.S. Appl. No. 14/535,764 for Concatenated Expected Responses for Speech Recognition filed Nov. 7, 2014 (Braho et al.); 51 pages.
U.S. Appl. No. 14/568,305 for Auto-Contrast Viewfinder for an Indicia Reader filed Dec. 12, 2014 (Todeschini); 29 pages.
U.S. Appl. No. 14/573,022 for Dynamic Diagnostic Indicator Generation filed Dec. 17, 2014 (Goldsmith); 43 pages.
U.S. Appl. No. 14/578,627 for Safety System and Method filed Dec. 22, 2014 (Ackley et al.); 32 pages.
U.S. Appl. No. 14/580,262 for Media Gate for Thermal Transfer Printers filed Dec. 23, 2014 (Bowles); 36 pages.
U.S. Appl. No. 14/590,024 for Shelving and Package Locating Systems for Delivery Vehicles filed Jan. 6, 2015 (Payne); 31 pages.
U.S. Appl. No. 14/596,757 for System and Method for Detecting Barcode Printing Errors filed Jan. 14, 2015 (Ackley); 41 pages.
U.S. Appl. No. 14/614,706 for Device for Supporting an Electronic Tool on a User's Hand filed Feb. 5, 2015 (Oberpriller et al.); 33 pages.
U.S. Appl. No. 14/614,796 for Cargo Apportionment Techniques filed Feb. 5, 2015 (Morton et al.); 56 pages.
U.S. Appl. No. 14/619,093 for Methods for Training a Speech Recognition System filed Feb. 11, 2015 (Pecorari); 35 pages.
U.S. Appl. No. 14/628,708 for Device, System, and Method for Determining the Status of Checkout Lanes filed Feb. 23, 2015 (Todeschini); 37 pages.
U.S. Appl. No. 14/662,922 for Multifunction Point of Sale System filed Mar. 19, 2015 (Van Horn et al.); 41 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/674,329 for Aimer for Barcode Scanning filed Mar. 31, 2015 (Bidwell); 36 pages.
U.S. Appl. No. 14/676,327 for Device Management Proxy for Secure Devices filed Apr. 1, 2015 (Yeakley et al.); 50 pages.
U.S. Appl. No. 14/687,289 for System for Communication via a Peripheral Hub filed Apr. 15, 2015 (Kohtz et al.); 37 pages.
U.S. Appl. No. 141695,364 for Medication Management System filed Apr. 24, 2015 (Sewell et al.); 44 pages.
U.S. Appl. No. 14/695,923 for Secure Unattended Network Authentication filed Apr. 24, 2015 (Kubler et al.); 52 pages.
U.S. Appl. No. 14/702,110 for System and Method for Regulating Barcode Data Injection Into a Running Application on a Smart Device filed May 1, 2015 (Todeschini et al.); 38 pages.

(56) References Cited

OTHER PUBLICATIONS

U.S. Appl. No. 14/702,979 for Tracking Battery Conditions filed May 4, 2015 (Young et al.); 70 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/707,123 for Application Independent DEX/UCS Interface filed May 8, 2015 (Pape); 47 pages.

U.S. Appl. No. 14/715,672 for Augumented Reality Enabled Hazard Display filed May 19, 2015 (Venkatesha et al.); 35 pages.

U.S. Appl. No. 14/715,916 for Evaluating Image Values filed May 19, 2015 (Ackley); 60 pages.

U.S. Appl. No. 14/735,717 for Indicia-Reading Systems Having an Interface With a User's Nervous System filed Jun. 10, 2015 (Todeschini); 39 pages.

U.S. Appl. No. 14/740,320 for Tactile Switch for a Mobile Electronic Device filed Jun. 16, 2015 (Bamdringa); 38 pages.

U.S. Appl. No. 14/740,373 for Calibrating a Volume Dimensioner filed Jun. 16, 2015 (Ackley et al.); 63 pages.

U.S. Appl. No. 14/747,197 for Optical Pattern Projector filed Jun. 23, 2015 (Thuries et al.); 33 pages.

U.S. Appl. No. 14/747,490 for Dual-Projector Three-Dimensional Scanner filed Jun. 23, 2015 (Jovanovski et al.); 40 pages.

U.S. Appl. No. 14/748,446 for Cordless Indicia Reader With a Multifunction Coil for Wireless Charging and EAS Deactivation, filed Jun. 24, 2015 (Xie et al.); 34 pages.

U.S. Appl. No. 29/516,892 for Table Computer filed Feb. 6, 2015 (Bidwell et al.); 13 pages.

U.S. Appl. No. 29/519,017 for Scanner filed Mar. 2, 2015 (Zhou et al.); 11 pages.

\* cited by examiner

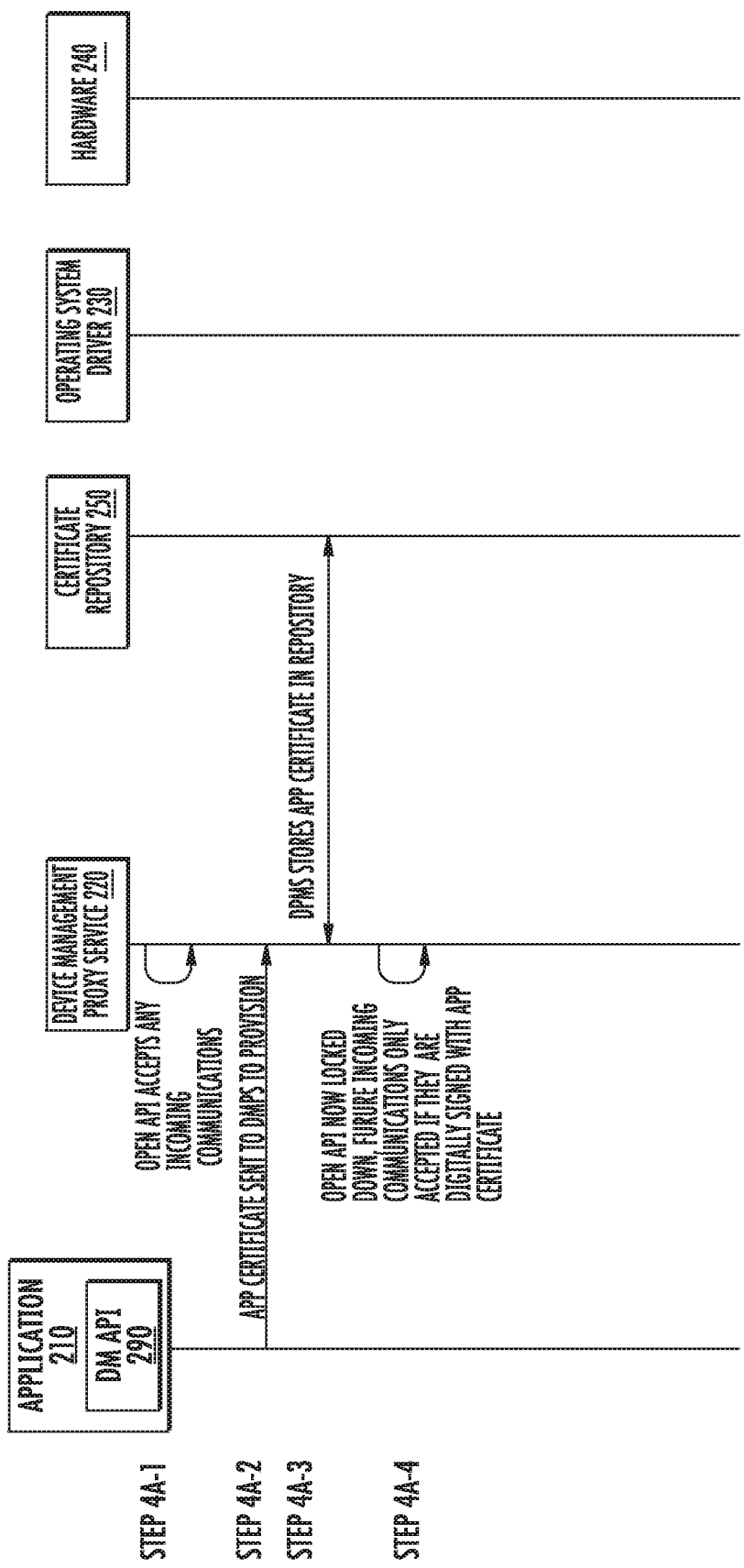

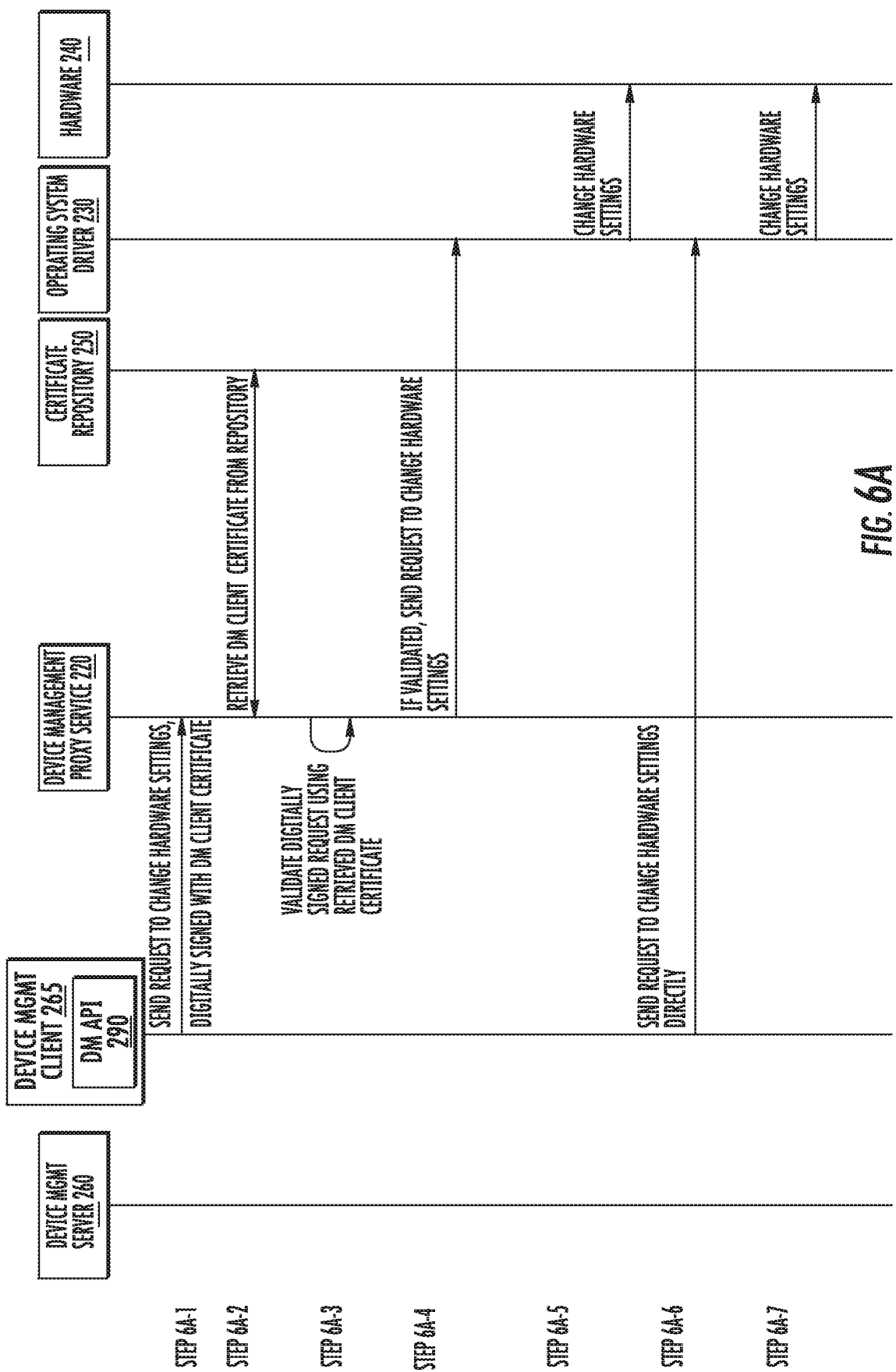

DEVICE MANAGEMENT PROXY FOR SECURE DEVICES

CROSS-REFERENCE TO RELATED APPLICATION

The present application claims the benefit of U.S. patent application Ser. No. 14/676,327 for Device Management Proxy for Secure Devices filed Apr. 1, 2015 (and published Oct. 6, 2016 as U.S. Patent Application Publication No. 2016/0294779), now U.S. Pat. No. 9,930,050. Each of the foregoing patent application, patent publication, and patent is hereby incorporated by reference in its entirety.

FIELD OF THE INVENTION

The present invention relates to the security of hardware devices running applications.

BACKGROUND

Recent years have seen a worldwide proliferation of electronic devices. Hardware manufacturers have been able to use standard operating systems such as, for example, popular smartphone operating systems like Google Android™, Apple iOS™, and Microsoft Windows Embedded 8 Handheld™ to create a new generation of products to enhance productivity and address various challenges in both the personal and commercial realm. Further, a robust software ecosystem has emerged around many of these devices to enhance their functionality and utility and to leverage the vast amount of information and services available from the Internet. The development of applications for these devices has undeniably been a significant factor in the market adoption of many of these devices. However, this development has also driven a need for enhanced security, as it is common nowadays for the hardware manufacturer, operating system provider, and application developer to be separate entities.

In the interest of increased security, the operating systems of many devices, now regularly restrict or eliminate the ability for applications to interact with hardware device settings. A current solution to this problem involves the elevation of the privileges of the application. However, the privilege rights offered by the operating systems are typically not specific enough to provide access only to the hardware settings that the application desires. The result is a different kind of security risk in that applications with elevated privileges have access to critical functionality that exceeds their needs.

Therefore, there is a need for further advances in hardware device architectures that allow for operating systems to provide applications with secure and specific access to hardware device settings.

SUMMARY

Accordingly, in one embodiment of the present invention, access to the hardware device settings are controlled by a device management proxy service (DMPS) that is digitally signed and that only accepts requests to change the hardware device settings from applications that have been provisioned on the device and send validated signed requests.

In another embodiment of the present invention, access to the hardware device settings are controlled by a device management proxy service (DMPS) that is digitally signed but runs on a server as a separate service and that only accepts requests to change the hardware device settings from applications that have been provisioned on the device and send validated signed requests.

In yet another exemplary embodiment of the present invention, access to the hardware device settings are controlled by a device management proxy service (DMPS) that is digitally signed but runs on a server as a separate service and that only accepts requests to change the hardware device settings from applications that have been provisioned on the device and operated with account and group privileges sufficient to send validated signed requests.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIGS. 4A-4B are schematics outlining the initial provisioning of the device with applications according to different embodiments of the disclosed subject matter.

FIGS. 6A-6B are schematics outlining the flow of information according to different embodiments of the disclosed subject matter involving device management solutions applications on the device.

DETAILED DESCRIPTION

The present invention involves the concept of applications or device management solutions using digitally signed communications to interact with operating system services in order to provide secure and managed access to hardware settings on a device. In the present disclosure, "digitally signed" is meant in the context of public/private key cryptography, i.e. digitally signed communications are messages, data, or documents that are sent with a digital certificate or identity certificate issued by a certificate authority meant to demonstrate the authenticity of the sender. In the present disclosure, "applications" refer to software applications that are offered by independent software vendors, and "device management solutions" refer to commercial mobile device management software technology applications, such as applications offered by vendors including but not limited to SOTI™, LANDESK™, CITRIX™, AIRWATCH™, and the like.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Figure 1:
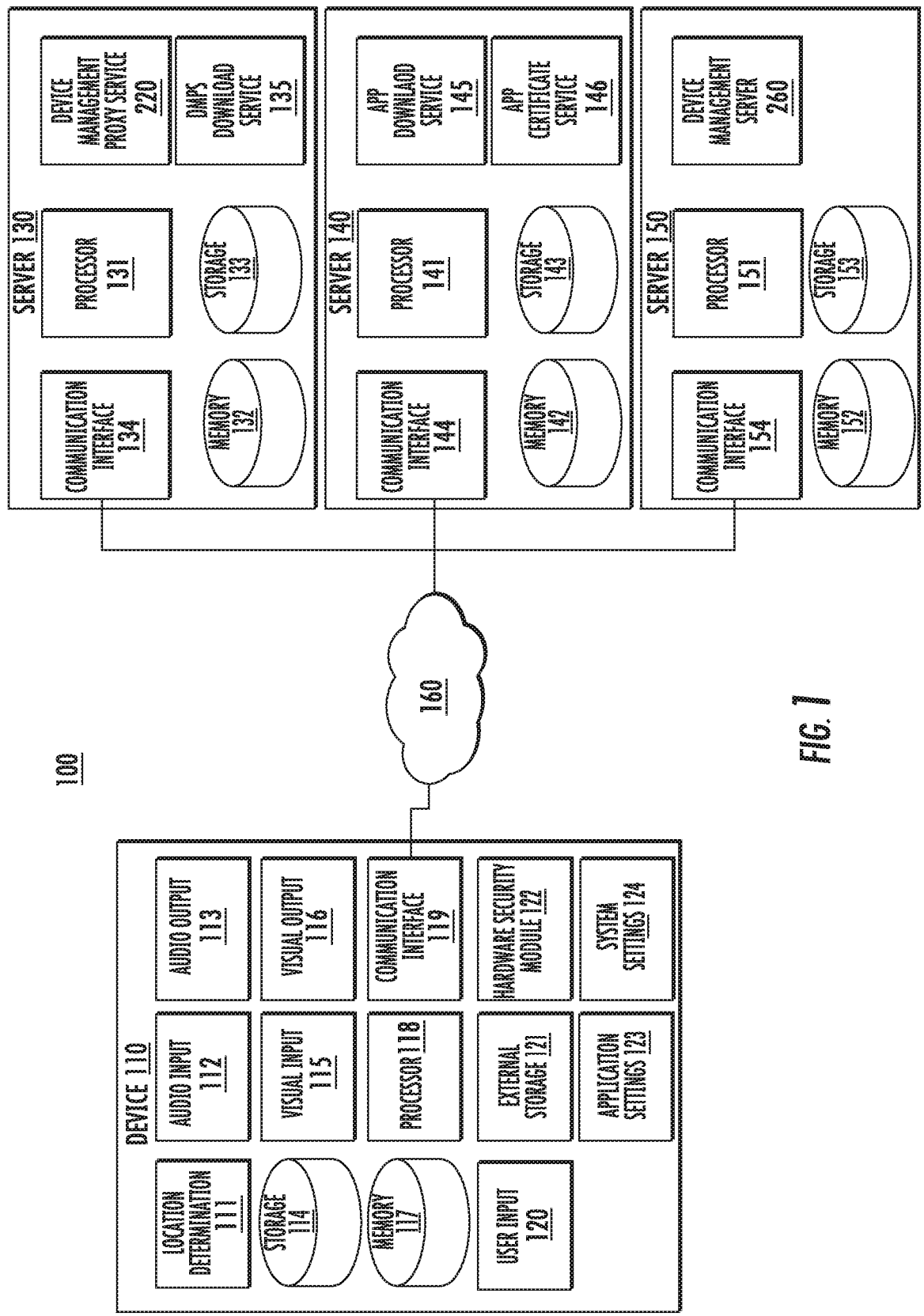
FIG. 1 is a block diagram of the elements of the system in accordance with one embodiment of the disclosed subject matter.

FIG. 1 illustrates an exemplary system 100 for one embodiment of the present invention. In general, the system 100 includes a device 110 and one or more servers 130, 140, and 150. The servers 130, 140, and 150 and the device 110 are connected via a network 160. The network 160 may be any type of Wide Area Network (WAN), such as the Internet, Local Area Network (LAN), or the like, or any combination thereof, and may include wired components, such as Ethernet, wireless components, such as LTE or Wi-Fi, or both wired and wireless components. Note that while the servers 130, 140, and 150 are illustrated as individual single servers, each may be alternatively distributed across multiple servers having the respective functionality of the single servers 130, 140, and 150 shown in FIG. 1. And still in other embodiments, the servers 130, 140, and 150 may also be combined into one single server or distributed across multiple servers having the overall combined functionality of servers 130, 140, and 150.

In general, the server 130 includes at least one processor 131 and associated memory 132 and a communication interface 134. The server 130 may also include additional components such as a storage component 133, a Device Management Proxy Service (DMPS) 220, and a DMPS Download Service 135, as described below. The components of server 130 may be interconnected using one more buses (not shown) and may be mounted on a motherboard (not shown) or some other appropriate configuration.

In general, the server 140 includes at least one processor 141 and associated memory 142 and a communication interface 144. The server 140 may also include additional components such as a storage component 143 and an application download service 145 and an application certificate service 146, as described below. The components of server 140 may be interconnected using one more buses (not shown) and may be mounted on a motherboard (not shown) or some other appropriate configuration. In one embodiment, the device 110 may download digitally signed and provisioned applications 210 from the app download service 145 of server 140 or may obtain new or updated provisioning certificates for applications 210, user accounts 270, and/or groups 275 from the app certificate service 146 on server 140. In another embodiment, the device 110 may side load applications and/or certificates directly.

In general, the server 150 includes at least one processor 151 and associated memory 152 and a communication interface 154. The server 150 may also include additional components such as a storage component 153 and the server component of a device management solution, as described below. The components of server 150 may be interconnected using one more buses (not shown) and may be mounted on a motherboard (not shown) or some other appropriate configuration.

In general, the device 110 includes a processor 118 and associated memory 117 as well as a communication interface 119. The device 110 may include additional components such as a storage component 114 such as a hard drive or solid state drive, a location determination component 111 such as a Global Positioning System (GPS) chip, audio input component 112 such as a microphone, audio output component 113 such as a speaker, visual input component 115 such as a camera or barcode reader, visual output component 116 such as a display, and a user input component 120 such as a touchscreen, navigation shuttle, soft keys, or the like, an external storage component 121 such as a smart media card, micro Secure Digital card or the like, a hardware security module (HSM) 122, application settings 123 which are used to configure applications installed on the device 110 and may be stored in the storage 114 or memory 117 or a combination of both, and system settings which are used to configure the device 110 and may be stored in the storage 114 or memory 117 or a combination of both. The components of device 110 may be interconnected using one more buses (not shown) and may be mounted on a motherboard (not shown) or some other appropriate configuration. Examples of device 110 include, but are not limited to, consumer electronics such as smartphones, tablets, televisions, media players, smart watches, personal navigation devices, and health/activity trackers, and commercial electronics such as rugged mobile computers, vehicle mount computers, wearable scanners, barcode scanners, radio frequency identification (RFID) scanners, intelligent sensors, and tracking devices.

Figure 2A:
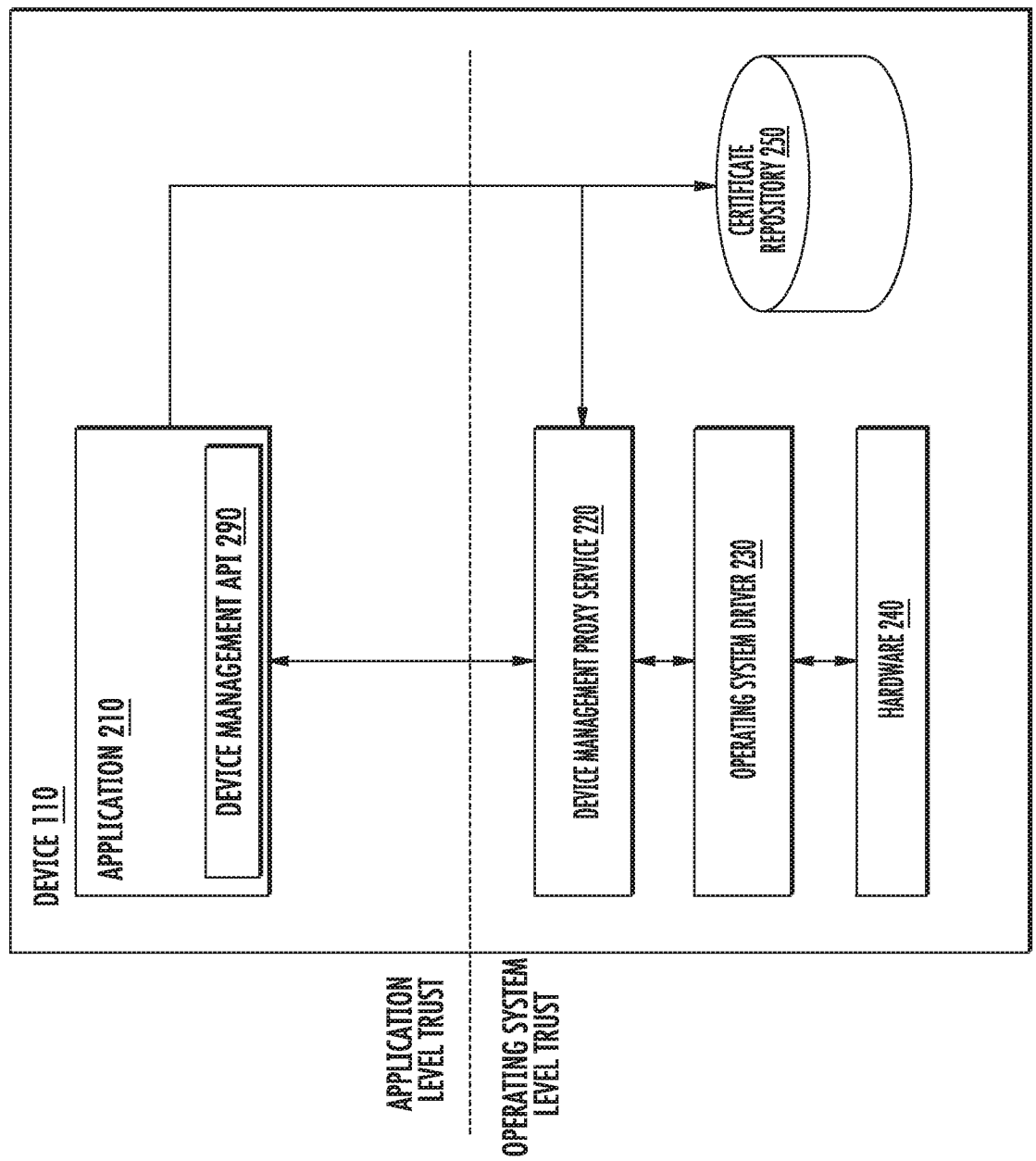
FIGS. 2A-2C graphically depict different embodiments of the disclosed subject matter involving applications on the device.

FIG. 2A illustrates one embodiment of the present invention. Application 210 is installed on device 110 in its own trust level, an application trust level, which is separate and distinct from the operating system trust level. The separate trust levels offer security on the device 110 so that applications cannot make changes to the hardware settings of the device 110 except through the mechanisms described in the present invention. At the operating system trust level, device 110 has a DMPS 220, a storage repository for storing digital certificates, i.e. a certificate repository 250, and an operating system driver 230 that interacts and controls the hardware elements 240 of the device.

The DMPS 220 is signed and provisioned by the operating system. In some embodiments, the DMPS 220 is included in the operating system image installed on the device by the manufacturer. In other embodiments, the DMPS 220 is loaded on the device 110 after manufacture, such as from a DMPS download service 135, but is still digitally signed and provisioned using the operating system vendor certificates.

The DMPS 220 is used on the device 110 to install and manage application certificates. The DMPS 220 may be implemented as a lightweight service, such as a daemon, that runs in the background or may be implemented as a device driver. In some embodiments, the DMPS 220 and storage repository for storing digital certificates 250 run on the hardware security module 122. The combination of the DMPS 220 and the certificate repository 250 on the HSM 122 ensure tamper-proof handling of the certificates.

The operating system driver 230 interacts with the DMPS 220 to relay hardware setting changes to the hardware elements 240 of the device. Settings that may be altered using the operating system driver 230 include, but are not limited to display settings, network settings, power management settings, global positioning system (GPS) settings, audio settings, user account settings, user personalization settings, time settings, file management settings, system settings, security settings, camera settings, and barcode scanner/reader settings. In some embodiments, the operating system driver is provisioned by the operating system vendor by inclusion in the operating system image installed on the device.

The application 210 and the DMPS 220 interact through a cross process communication, such as remote procedure calls (RPC) or system calls such as input/output control (ioctl) using a device management application programming interface (API) 290 over a protocol.

The DMPS 220 and the operating system driver 230 interact through a device driver API over a protocol. The operating system driver 230 has the ability to directly change the settings of the hardware element 240.

Figure 3A:
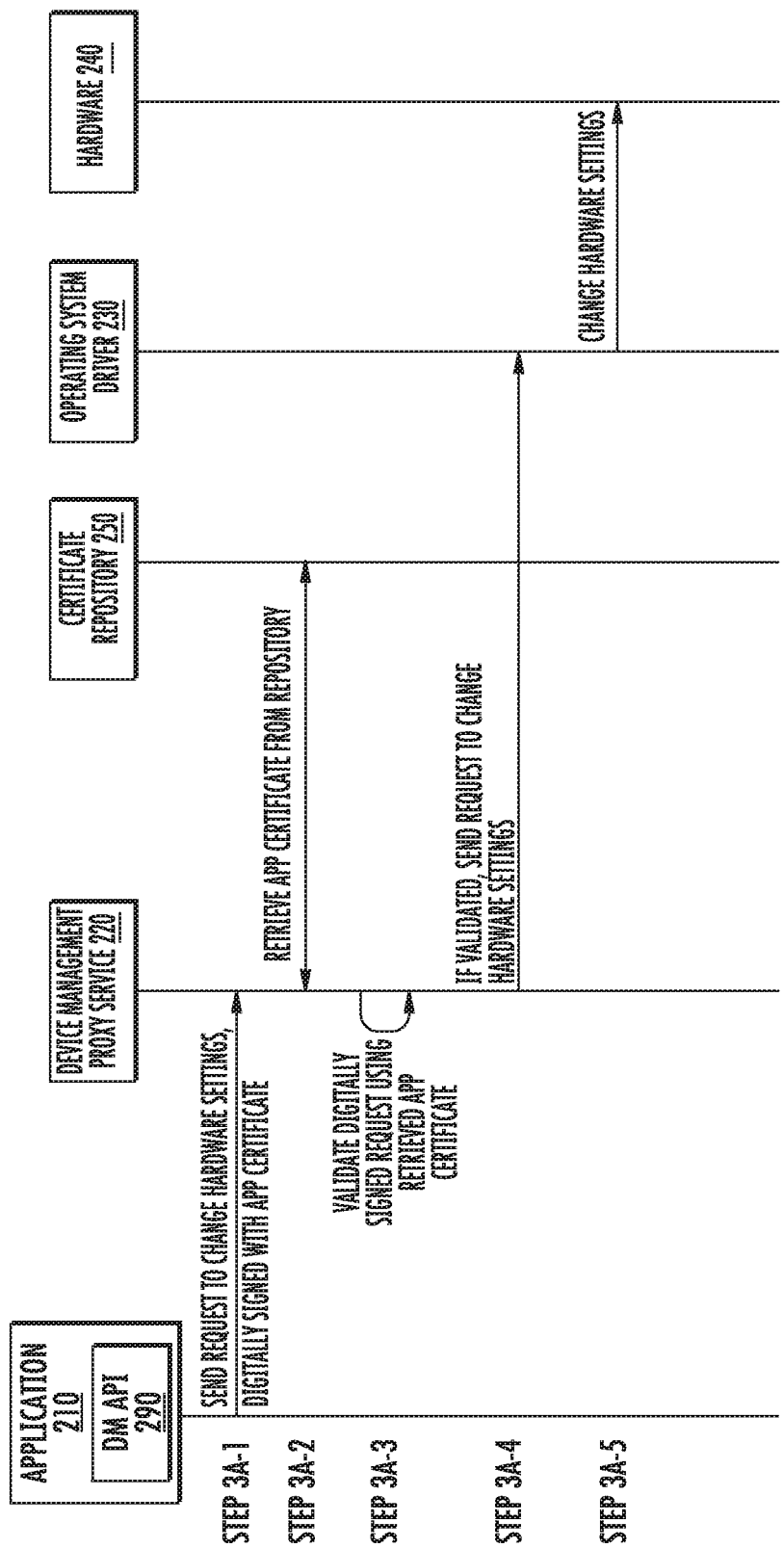
FIGS. 3A-3B are schematics outlining the flow of information according to different embodiments of the disclosed subject matter involving applications on the device.

FIG. 3A illustrates the communication flow between the application 210 and the DMPS 220. The application 210 first generates a digitally signed request to the DMPS 220 to change a hardware setting in a hardware element 240 (step 3A-1). The request is digitally signed using the application's digital certificate. The DMPS 220 retrieves the application's digital certificate from the certificate repository 250 (step 3A-2). The DMPS 220 then validates the digitally signed request using the retrieved application certificate (Step 3A-3). If validated, then the DMPS 220 sends the request to change the hardware setting to the operating system driver 230 (Step 3A-4) which then changes the setting of the hardware element 240 (step 3A-5).

Figure 2B:
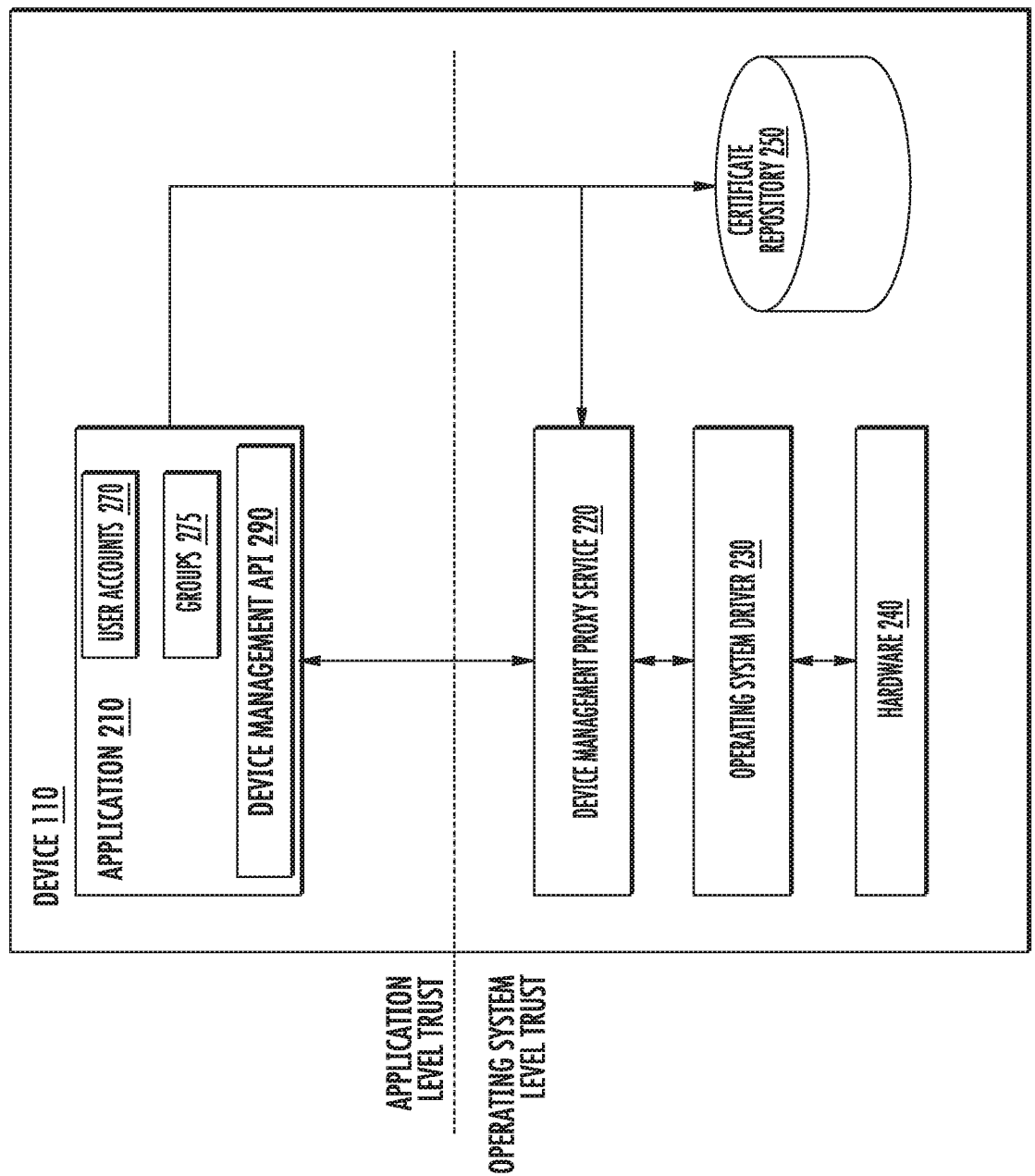

FIG. 2B illustrates another embodiment of the present invention. The embodiment in FIG. 2B is similar to FIG. 2A with the exception that user accounts 270 and/or groups 275 have been included in the application 210. In this embodiment, the application 210 has user and/or group privileges defined that control the functions of the application that are available to particular users or groups of users of the application.

Figure 3B:
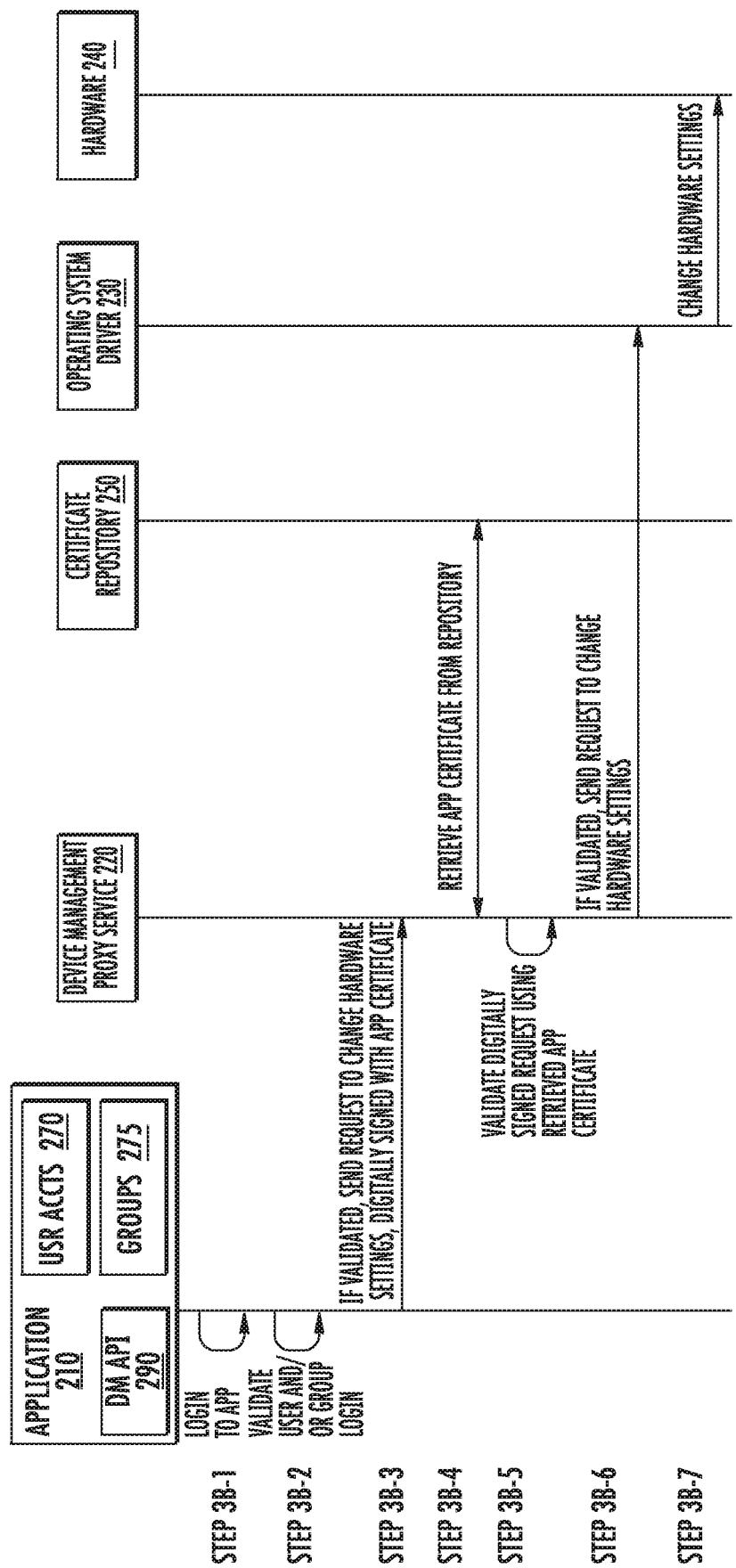

FIG. 3B is similar to FIG. 3A in that it illustrates the communication flow between the application 210 and the DMPS 220, but FIG. 3B further illustrates the involvement of the user accounts 270 and/or groups 275. A user first logs into the application 210 on the device 110 (Step 3B-1). The application 210 then validates the user's login (Step 3B-2). If the user is validated, then the application 210 controls the application functions with which the user may interact according to the user's login and/or group credentials. The applications functions controlled by the credentials include the ability of the user to generate hardware changes with the application. If permitted, the application 210 then generates a digitally signed request to the DMPS 220 to change a hardware setting in a hardware element 240 (step 3B-3). The request is digitally signed using the application's digital certificate. The DMPS 220 retrieves the application's digital certificate from the certificate repository 250 (step 3B-4). The DMPS 220 then validates the digitally signed request using the retrieved application certificate (Step 3B-5). If validated, then the DMPS 220 sends the request to change the hardware setting to the operating system driver 230 (Step 3B-6) which then changes the setting of the hardware element 240 (step 3B-7).

Figure 2C:
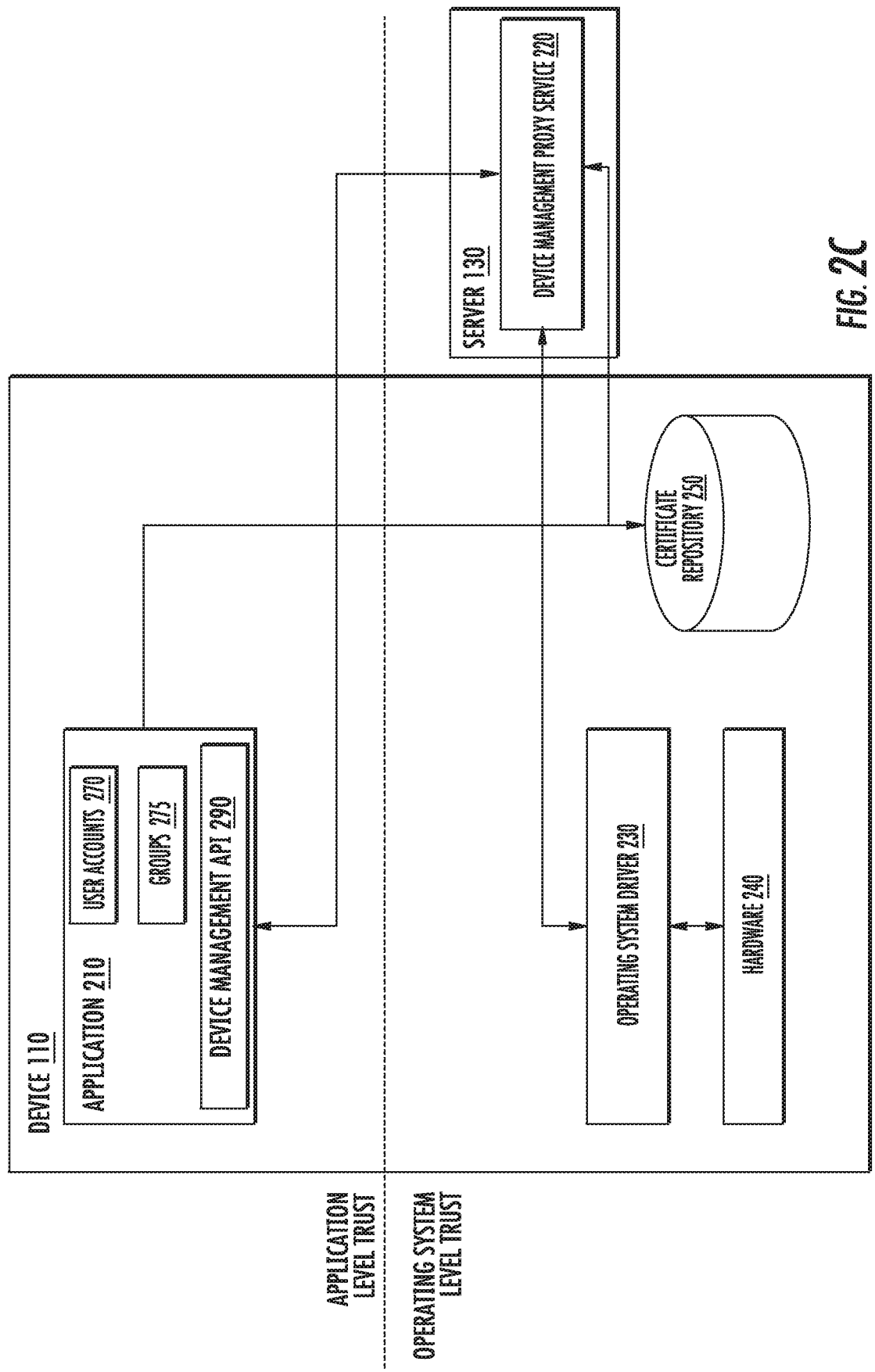

FIG. 2C illustrates another embodiment of the present invention. The embodiment in FIG. 2C is similar to FIG. 2B with the exception that in FIG. 2C the DMPS 220 is no longer running on the device 110 as in FIG. 2B but is now running on server 130 as a service over the network 160.

FIG. 4A illustrates the initial provisioning process according to one embodiment of the present invention. In this embodiment, the DMPS 220 utilizes an open API that accepts incoming connections from any application 210 (Step 4A-1). An application 210 is installed on the device 110 and attempts to communicate with the DMPS 220. Once the communication has been established between the DMPS 220 and the application 210, the application 210 sends its application certificate to the DMPS (Step 4A-2). Once the application certificate has been received, the DMPS 220 stores it in the certificate repository 250 (Step 4A-3). In this embodiment, the DMPS 220 has been programmed to close the open API once an application certificate has been provisioned and receive only incoming communications from that point on if they have been digitally signed with the application certificate (Step 4A-4). In other embodiments, the DMPS 220 is programmed to accept digital certificates from a pre-programmed number of different applications before closing the open API. For example, in one embodiment, the DMPS 220 could be programmed to accept digital certificates from up to 3 applications. In this instance, the DMPS 220 accepts application certificates from the first three unique applications with which it communicates. The very next unique application that tries to communicate with the DMPS 220 and send its digital certificate is not provisioned.

Figure 4B:
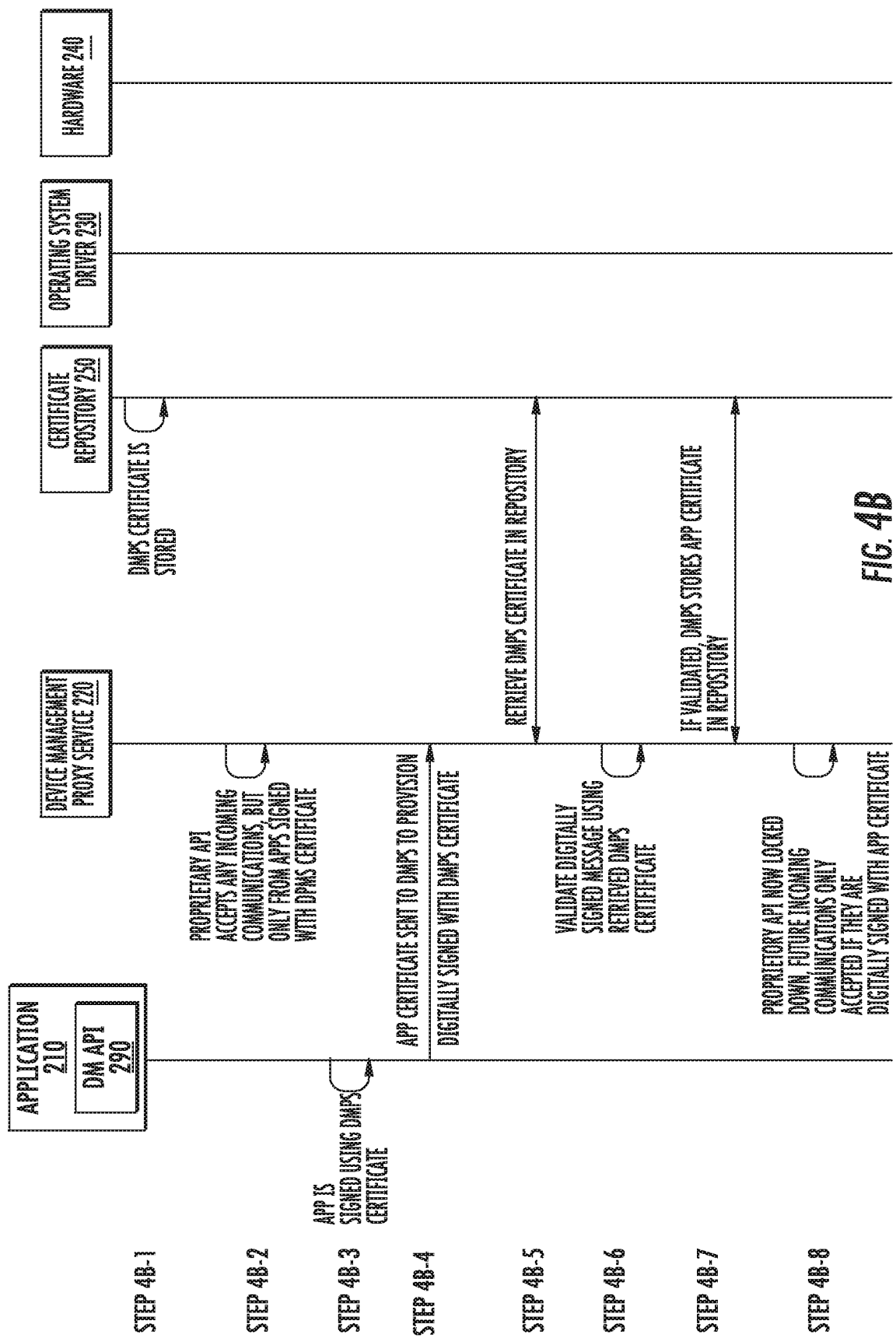

FIG. 4B illustrates the initial provisioning process according to another embodiment of the present invention. In this embodiment, the certificate repository 250 on the device 110 is first provisioned with a certificate from the provider of the DMPS 220, i.e. a DMPS certificate (Step 4B-1). The DMPS certificate could be installed in the certificate repository 250 as part of the operating system image used to manufacture the device or could be downloaded to the device 110 after manufacture from a DMPS download service 135 from server 130. The DMPS 220 utilizes a proprietary API that accepts incoming connections from any application 210 that is provisioned with the DMPS certificate (Step 4B-2). An application 210 that has been signed with the DMPS certificate (Step 4B-3) is installed on the device 110 and attempts to communicate with the DMPS 220 by sending its application certificate in a communication request that is digitally signed using the DMPS certificate (Step 4B-4). The DMPS 220 then retrieves the DMPS certificate from the certificate repository 250 (Step 4B-5). The DMPS 220 then validates the signature of the application message using the DMPS certificate (Step 4B-6). If validated, the DMPS 220 then stores the application's certificate in the certificate repository 250 (Step 4B-7). In this embodiment, the DMPS 220 has been programmed to close the proprietary API once an application certificate has been provisioned and receive only incoming communications from that point on if they have been digitally signed with the application certificate. In other embodiments, the DMPS 220 may keep the proprietary API open and accept incoming communications and digital certificates from any application that has been digitally signed using the DMPS certificate.

Figure 5A:
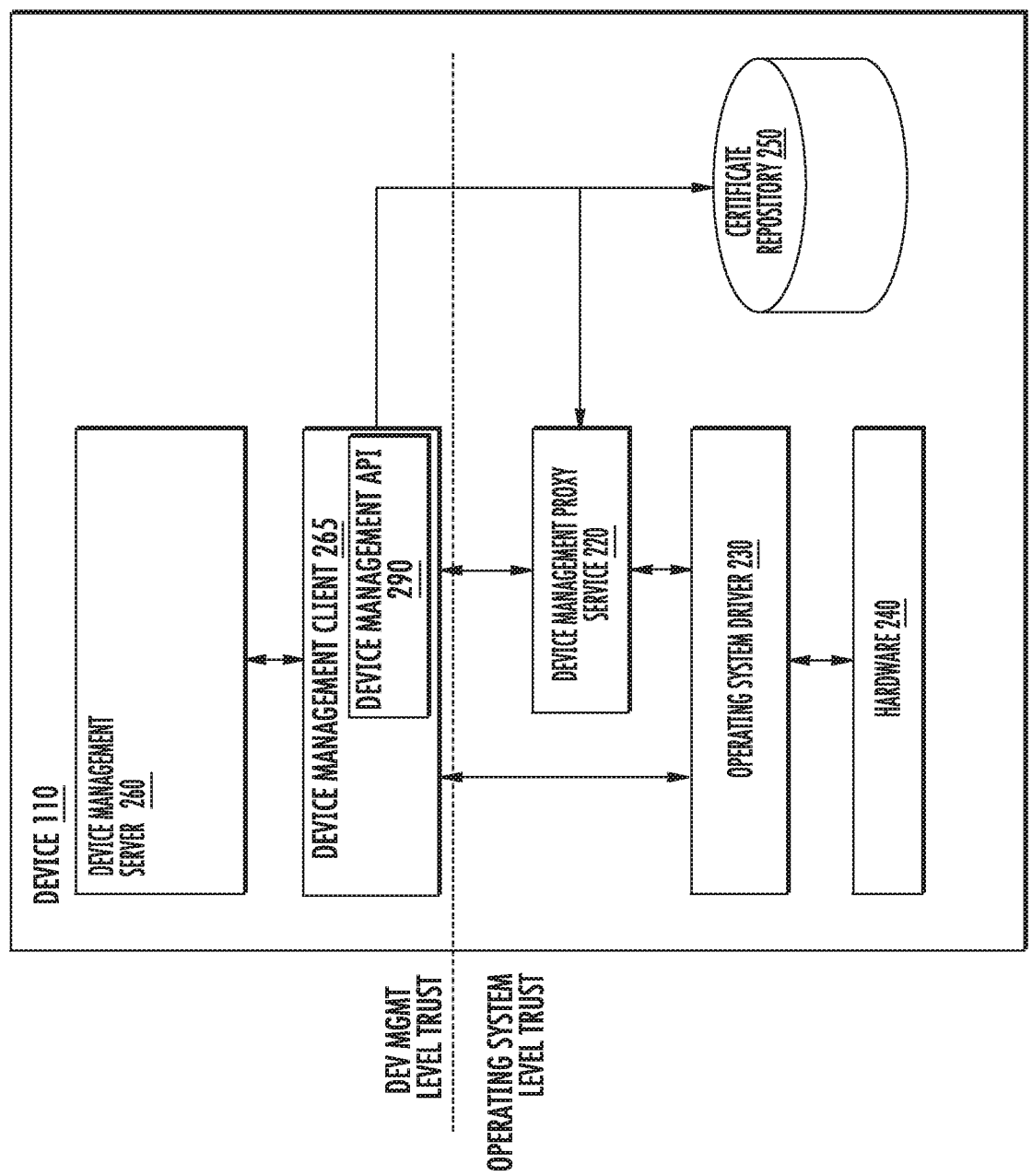
FIGS. 5A-5D graphically depict different embodiments of the disclosed subject matter involving device management solutions on the device.

FIG. 5A illustrates one embodiment of the present invention. In this embodiment, a device management solution is installed on the device 110. The device management solution may involve a device management server 260 component and a device management client 265 component. Again, the device management solution 260 and 265 is installed on device 110 in its own trust level, a device management trust level, which is separate and distinct from the operating system trust level. The separate trust levels offer security on the device 110 so that device management solutions cannot make changes to the hardware settings of the device 110 except through the mechanisms described in the present invention. At the operating system trust level, device 110 has a DMPS 220, a storage repository for storing digital certificates, i.e. a certificate repository 250, and an operating system driver 230 that interacts and controls the hardware elements 240 of the device.

The DMPS 220 is signed and provisioned by the operating system. In some embodiments, the DMPS 220 is included in the operating system image installed on the device by the manufacturer. In other embodiments, the DMPS 220 is loaded on the device 110 after manufacture, such as from a DMPS download service 135, but is still digitally signed and provisioned using the operating system vendor certificates.

The DMPS 220 is used on the device 110 to install and manage the device management client certificates. The DMPS 220 may be implemented as a lightweight service, such as a daemon, that runs in the background or may be implemented as a device driver. In some embodiments, the DMPS 220 and certificate repository 250 run on the hardware security module 122. The combination of the DMPS 220 and the certificate repository 250 on the HSM 122 ensure tamper-proof handling of the certificates.

The operating system driver 230 interacts with the DMPS 220 to relay hardware setting changes to the hardware elements 240 of the device. Settings that may be altered using the operating system driver 230 include, but are not limited to display settings, network settings, power management settings, global positioning system (GPS) settings, audio settings, user account settings, user personalization settings, time settings, file management settings, system settings, security settings, camera settings, and barcode scanner/reader settings. In some embodiments, the operating system driver is provisioned by the operating system vendor by inclusion in the operating system image installed on the device.

The device management server 260 and the device management client 265 communicate using a proprietary protocol from the provider of the device management solution. The device management client 265 and the DMPS 220 interact through a cross process communication, such as remote procedure calls (RPC) or system calls such as input/output control (ioctl) using a device management application programming interface (API) 290 over a protocol.

The DMPS 220 and the operating system driver 230 interact through a device driver API over a protocol. The operating system driver 230 has the ability to directly change the settings of the hardware element 240.

FIG. 6A illustrates the communication flow between the device management client 265 and the DMPS 220. The device management client 265 first generates a digitally signed request to the DMPS 220 to change a hardware setting in a hardware element 240 (step 6A-1). The request is digitally signed using the device management client's digital certificate. The DMPS 220 retrieves the device management client's digital certificate from the certificate repository 250 (step 6A-2). The DMPS 220 then validates the digitally signed request using the retrieved device management client certificate (Step 6A-3). If validated, then the DMPS 220 sends the request to change the hardware setting to the operating system driver 230 (Step 6A-4) which then changes the setting of the hardware element 240 (step 6A-5). In some embodiments, the device management client 265 is authorized to access the operating system driver 230 directly (Step 6A-6) to effect a change in the setting of the hardware element (Step 6A-7). In this embodiment, the device management solution has the ability to change some hardware settings directly, i.e. native support to change some hardware settings, but has its abilities augmented to change additional hardware settings through the DMPS 220 that may not be natively supported.

Figure 5B:
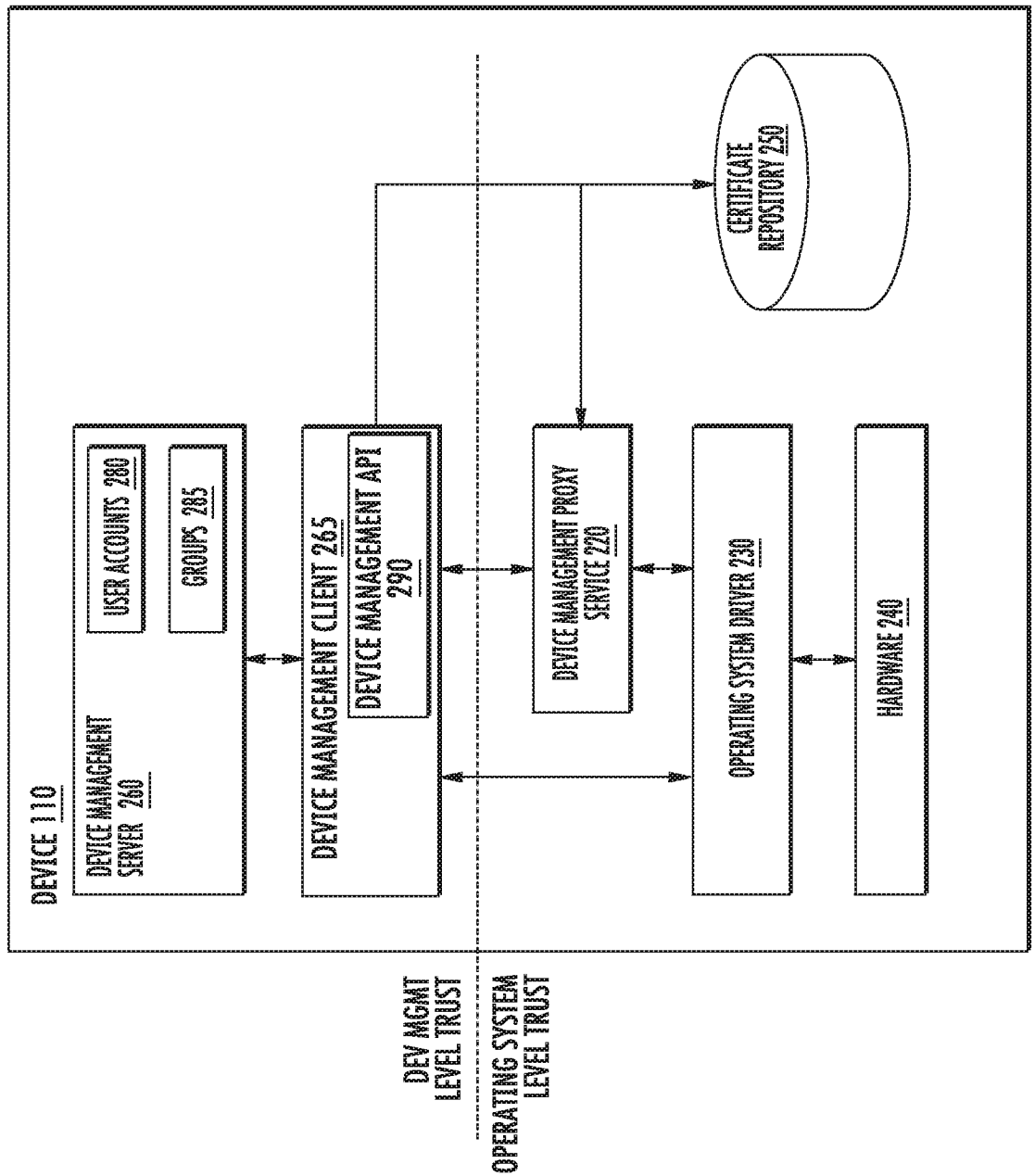

FIG. 5B illustrates another embodiment of the present invention. The embodiment in FIG. 5B is similar to FIG. 5A with the exception that user accounts 280 and/or groups 285 have been included in the device management server 260. In this embodiment, the device management server 260 has user and/or group privileges defined that control the functions of the device management client 265 that are available to particular users or groups of users of the device management client 265.

Figure 6B:
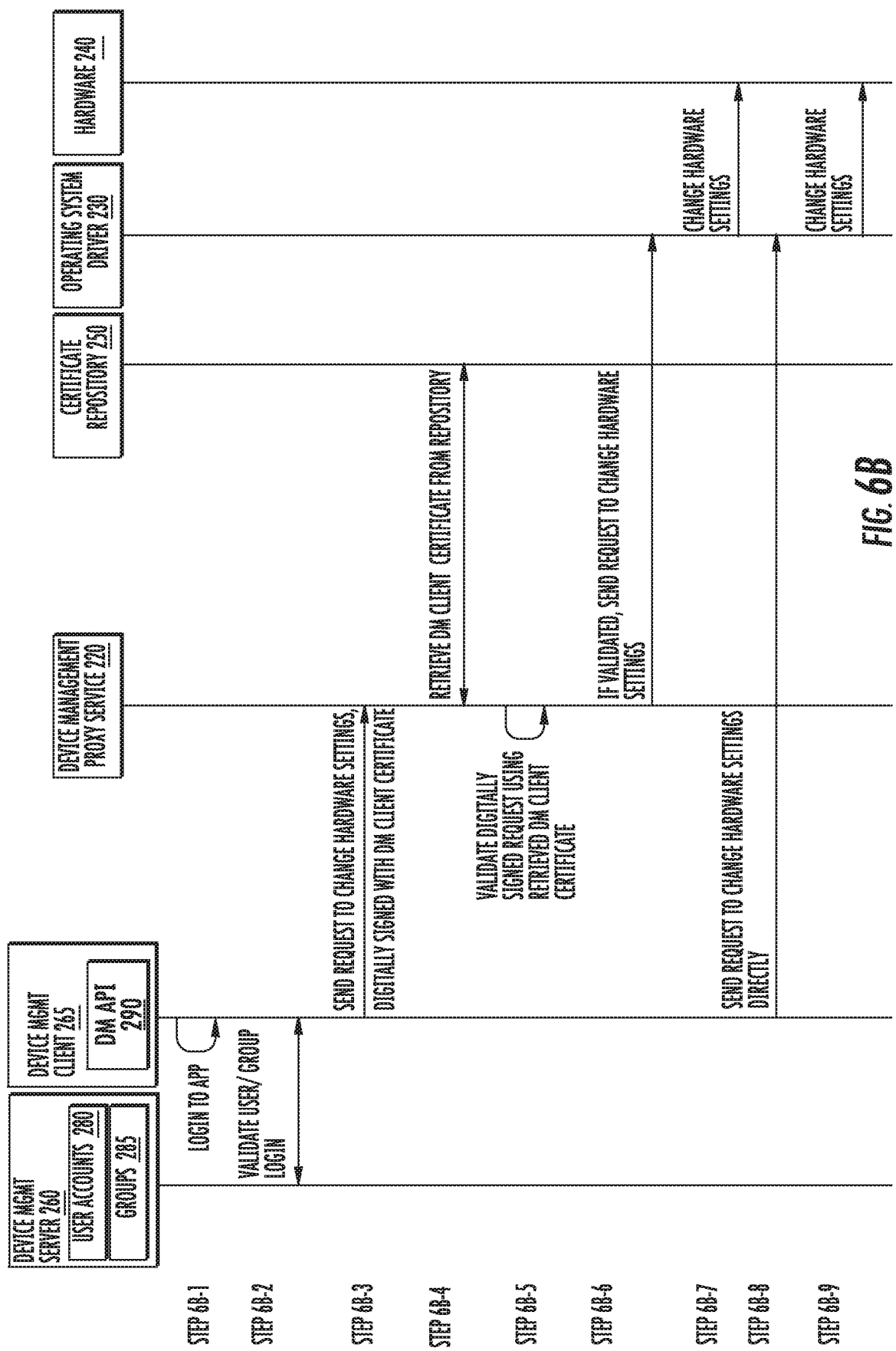

FIG. 6B is similar to FIG. 6A in that it illustrates the communication flow between the device management client 265 and the DMPS 220, but FIG. 6B further illustrates the involvement of the user accounts 280 and/or groups 285. A user first logs into the device management client 265 on the device 110 (Step 6B-1). The device management client 265 then communicates with the device management server 260 to authenticate the login (Step 6B-2). If the user is validated, then the device management client 265 controls the device management client with which the user may interact according to the user's login and/or group credentials set at the device management server 260. The device management client functions controlled by the credentials include the ability of the user to generate hardware changes through the device management client. If permitted, the device management client 265 then generates a digitally signed request to the DMPS 220 to change a hardware setting in a hardware element 240 (step 6B-3). The request is digitally signed using the device management client's digital certificate. The DMPS 220 retrieves the device management client's digital certificate from the certificate repository 250 (step 6B-4). The DMPS 220 then validates the digitally signed request using the retrieved device management client certificate (Step 6B-5). If validated, then the DMPS 220 sends the request to change the hardware setting to the operating system driver 230 (Step 6B-6) which then changes the setting of the hardware element 240 (step 6B-7). In some embodiments, the device management client 265 is authorized to access the operating system driver 230 directly (Step 6B-8) to effect a change in the setting of the hardware element (Step 6B-9). In this embodiment, the device management solution has the ability to change some hardware settings directly, i.e. native support to change some hardware settings, but has its abilities augmented to change additional hardware settings through the DMPS 220 that may not be natively supported.

Figure 5C:
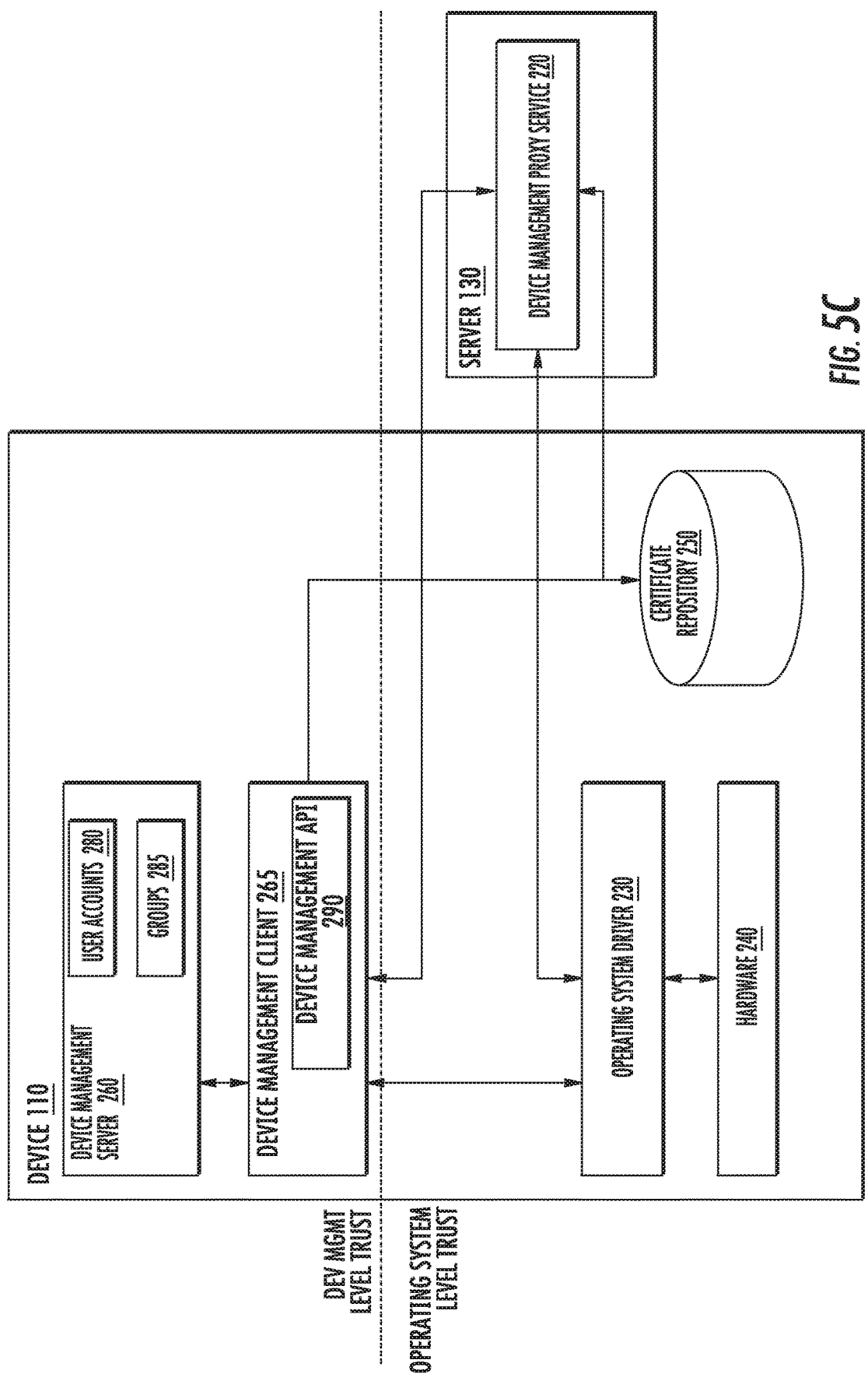

FIG. 5C illustrates another embodiment of the present invention. The embodiment in FIG. 5C is similar to FIG. 5B with the exception that in FIG. 5C the DMPS 220 is no longer running on the device 110 as in FIG. 5B but is now running on server 130 as a service over the network 160.

Figure 5D:
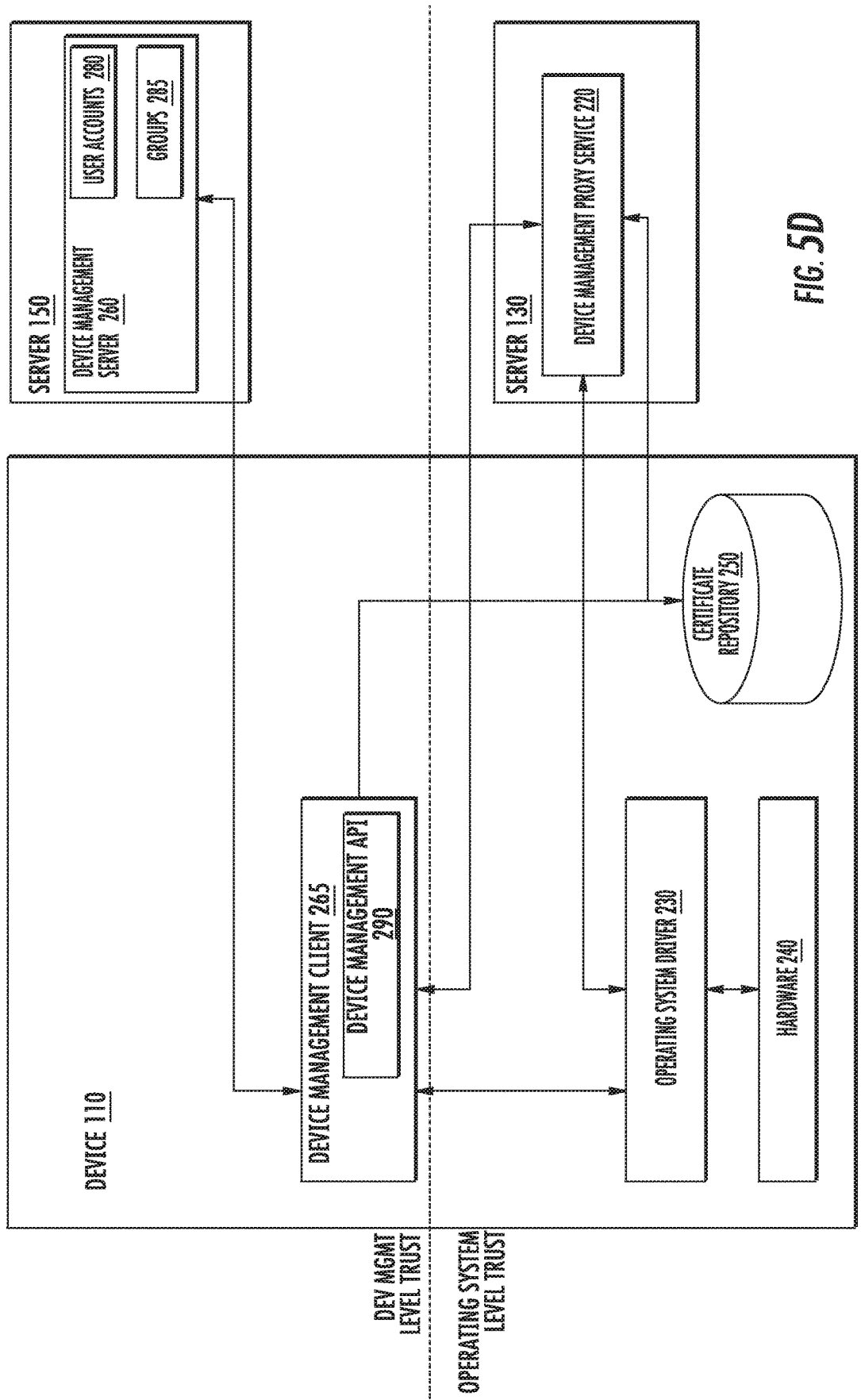

FIG. 5D illustrates another embodiment of the present invention. The embodiment in FIG. 5D is similar to FIG. 5C with the exception that in FIG. 5D the device management server 260 is no longer running on the device 110 as in FIG. 5C but is now running on server 150 as a service over the network 160.

Figure 7:
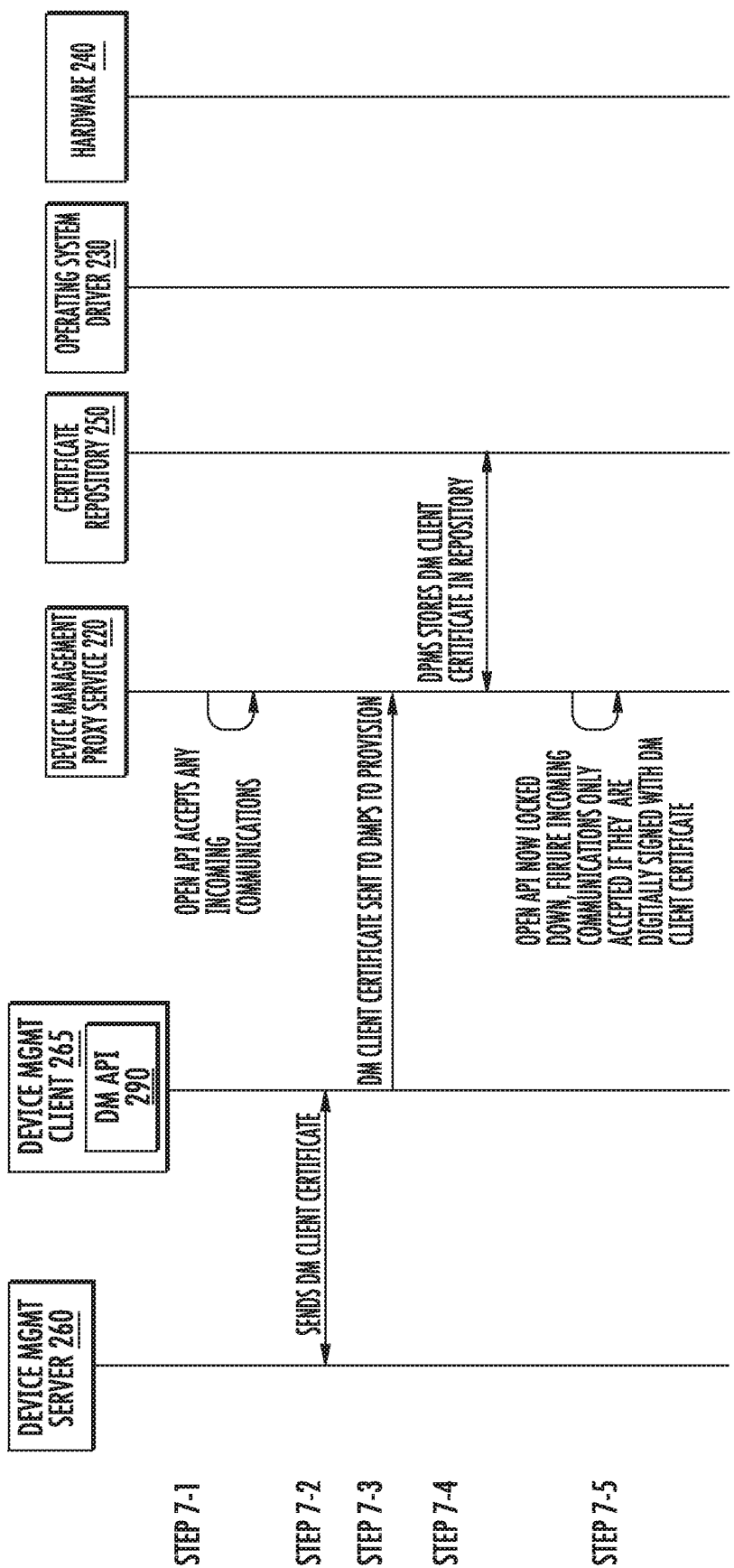
FIG. 7 is a schematic outlining the initial provisioning of the device with a device management solution according to one embodiment of the disclosed subject matter.

FIG. 7 illustrates the initial provisioning process according to one embodiment of the present invention. In this embodiment, the DMPS 220 utilizes an open API that accepts incoming connections from any device management client 265 (Step 7-1). A device management client 265 is installed on the device 110, retrieves the device management client certificate from the device management server 260 (Step 7-2) which may be running on its own server 150 over the network 160, and attempts to communicate with the DMPS 220. Once the communication has been established between the DMPS 220 and the device management client 265, the device management client 265 sends the device management client certificate to the DMPS (Step 7-3). Once the device management client certificate has been received, the DMPS 220 stores it in the certificate repository 250 (Step 7-4). In this embodiment, the DMPS 220 has been programmed to close the open API once a device management client certificate has been provisioned and receive only incoming communications from that point on if they have been digitally signed with the device management certificate (Step 7-5). In other embodiments, the DMPS 220 is programmed to accept digital certificates from a pre-programmed number of different device management clients before closing the open API. In yet other embodiments, the DMPS 220 may continue to utilize the open API to accept incoming connections from any device management solution that may be installed on the device 110.

Several implementations have been described herein. However, it will be understood that various modifications may be made without departing from the spirit and scope of the invention.

Additionally, the communication flows in the schematics of the figures do not require the particular order shown or sequential order to achieve the specified results. Further, other steps may be provided or eliminated from the schematics and other components may be added to or removed from the described systems. These other implementations are within the scope of the claims.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; D702,237; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,526; 8,798,367; 8,807,431; 8,807,432; 8,820,630;

International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;

U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Check-out Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTI-FUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

The invention claimed is:

1. A device, comprising:
a first software module;
a second software module;
a third software module;
at least one hardware processor; and
memory storing hardware settings related to at least one hardware element and the first and second software modules executable by the at least one hardware processor to:
cause the first software module to transmit a first digitally signed request to the second software module,
cause the second software module to validate the first digitally signed request received from the first software module by retrieving a digital certificate associated with the first software module from a repository, wherein the first digitally signed request is validated based on the retrieved digital certificate associated with the first software module,
in response to validating the digitally signed request, causing the second software module to generate and transmit a second digitally signed request, to change the hardware settings, to the third software module, wherein the second software module is signed by the third software module using one or more certificates associated with the third software module, and
cause the third software module to change the hardware settings in response to the receipt of the second digitally signed request.

2. The device of claim 1, wherein the first software module is an application.

3. The device of claim 2, wherein the application is a device management solution.

4. The device of claim 1, wherein the second software module is a device management proxy service and the third software module is an operating system installed on the device.

5. The device of claim 4, wherein the device management proxy service is embedded in a device driver.

6. The device of claim 4, wherein the device management proxy service is embedded in a hardware security module (HSM).

7. The device of claim 1, wherein the first and second software modules interact through a cross-process communication using a device management application programming interface (API) over a protocol.

8. The device of claim 7, wherein the cross-process communication is one of a group consisting of: remote procedure calls (RPC), system calls, and input/output control (ioctl).

9. The device of claim 1, wherein the access to the first software module is dependent upon at least one of user privileges and group privileges.

10. The device of claim 1, wherein the hardware settings are display settings, network settings, power management settings, global positioning system (GPS) settings, audio settings, user account settings, user personalization settings, time settings, file management settings, system settings, security settings, camera settings, and barcode scanner/reader settings.

11. The device of claim 1, wherein the first software module, the second software module, and the third software module are installed in the device.

* * * * *